United States Patent [19]

Gukkenberger et al.

[11] Patent Number: 4,821,404
[45] Date of Patent: Apr. 18, 1989

[54] METHOD OF CONNECTING A MAGNETIC HEAD CORE WITH A MOUNTING PLATE

[76] Inventors: Horst Gukkenberger, Weiherhofer-Haupstr. 81, D-8502 Zirndorf; Karl Eberle, Blütenstr. 15, D-8501 Cadolzburg; Klaus J. Köpnick, Königsbergerstr. 42, D-8510 Fürth, all of Fed. Rep. of Germany

[21] Appl. No.: 82,885

[22] Filed: Aug. 3, 1987

[30] Foreign Application Priority Data

Aug. 2, 1986 [DE] Fed. Rep. of Germany ....... 3626274

[51] Int. Cl.$^4$ ................................................. G11B 5/42
[52] U.S. Cl. ..................................... 29/603; 228/124; 228/208; 360/128; 360/129
[58] Field of Search .................. 29/603; 228/124, 208; 360/104, 128, 129, 125–127

[56] References Cited

U.S. PATENT DOCUMENTS

| | | | |
|---|---|---|---|
| 3,793,705 | 2/1974 | Cole, III | 228/124 |
| 3,795,954 | 3/1974 | Alex et al. | 29/603 |
| 3,846,906 | 11/1974 | Case | 29/603 |
| 3,873,944 | 3/1975 | Vaguine et al. | 228/124 X |
| 4,048,714 | 9/1977 | Huntt | 29/603 |

FOREIGN PATENT DOCUMENTS 43211  3/1985  Japan .................................... 29/603

*Primary Examiner*—Carl E. Hall
*Attorney, Agent, or Firm*—F. Brice Faller

[57] ABSTRACT

A method for connecting a magnetic head core (1) with a mounting plate (2) in which the magnetic head core consists of ferrite and is separated from a preformed core block (4). Prior to separation the core block is soldered to a metal block (5) and the magnetic head core is then separated jointly with the mounting plate, from the overall block.

8 Claims, 1 Drawing Sheet

METHOD OF CONNECTING A MAGNETIC HEAD CORE WITH A MOUNTING PLATE

BACKGROUND OF THE INVENTION

The invention relates to a method of connecting a magnetic head core with a mounting plate to form a video magnetic head unit, in which the core of the magnetic head consists of ferrite and is separated from a preformed core block.

It is known that the magnetic core of a video magnetic head comprises two connected core halves having a non-magnetic gap. The single, very thin magnetic core is manufactured in known manner by slicing a preformed and premanufactured core block. After grinding the tape contact face and after winding at least one yoke of the magnetic core, the video magnetic head is connected to a mounting plate by means of an adhesive. A complete magnetic head unit of this type thus consists of a mounting plate with a magnetic head adhered to it. This head unit is screwed onto a head disc in a predetermined position and after the head disc has been built in a head drum of a video magnetic tape apparatus the video head is adjusted to the required tape height position. A drawback of a magnetic head unit of the type described is that the separate steps of processing the magnetic core and the mounting plate as well as the additional adhesion of the two parts are considerably cumbersome.

SUMMARY OF THE INVENTION

The core block is connected to a metal block on the side remote from the tape contact face by means of meltable solder, for example glass solder or metal solder to form an overall block, or the metal block is formed by means of metal electro-deposition a magnetic core with a mounting plate connected to form a single piece is jointly separated from the overall block and at least one wire coil is wound around the core.

DETAILED DESCRIPTION OF THE DRAWINGS

Figures 1, 2:
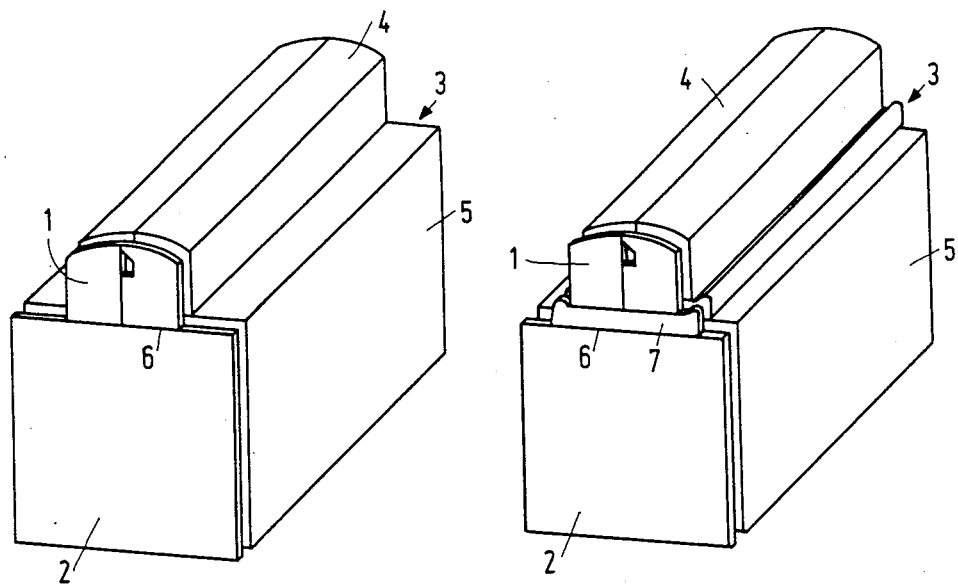
FIG. 1 is a perspective view of a magnetic head core having a mounting plate connected to it, which are separated from an overall block.
FIG. 2 shows a magnetic head core with a mounting plate similar to that in FIG. 1, but with an intermediate layer provided by means of electro-deposition.

FIG. 1 is a perspective view of a magnetic core 1 with a mounting plate 2 in which the two connected parts are jointly separated from an overall block 3, for example by means of abrasive cutting. The overall block 3 consists of a preformed core block 4 and a metal block 5. The core block comprises two core block 4 halves. The core block 4 and the metal block 5 are preferably soldered together by means of glass solder 6 or metal solder. The connected parts can be separated in arbitrary piece numbers from the overall block 3 thus connected and they have already the desired core or plate strength. To improve the solderability of the two block parts, a bonding layer is preferably provided on the core block connecting face between the core block 1 and the glass solder 6. The bonding layer which consists of, for example Cr, Ag, Ti, $TiO_2$ or CrO, is provided by means of vapour-deposition or sputtering. The bonding layer is used to form a better connection between the ferrite core block 4 and the glass solder 6.

Figure 3:
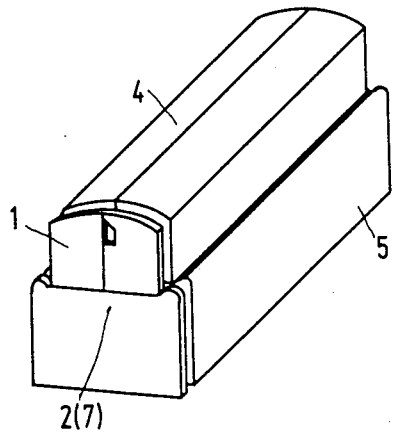
FIG. 3 shows a magnetic head core with a mounting plate similar to that in FIG. 2, but with a mounting plate provided by means of electro-deposition.

FIG. 2 shows how the connection between the bonding layer and the glass solder 6 is reinforced by an additional metal layer 7 formed by means of electro-deposition. The bonding surface between the core block 4 and the metal block 5 and thus between the magnetic core 1 and the mounting plate 2 is enlarged thereby and strengthens the soldering connection 6. In FIG. 3 the metal layer 7 formed by way of electro-deposition is used to form a metal block 5 connected to the core block 4. Consequently, the soldering connection by means of glass solder can be dispensed with, but the technical complications are quite considerable. The wire winding required for finishing the magnetic head is finally provided in the form of a coil wound around at least one core half.

What is claimed is:

1. A method of connecting a magnetic head core having a tape contact face to a mounting plate to form a video magnetic head unit, comprising the following steps providing a ferrite core block from which the individual head cores are to be separated, said core block having a connecting face opposite the tape contact face, providing a bonding layer on the connecting face, connecting the core block to a metal block from which the mounting plates are to be separated by means of solder provided between the bonding layer and the metal block, and jointly separating a magnetic core and a mounting plate as a single piece from the overall block formed by the core block and the metal block.

2. A method as in claim 1 further comprising the step of electrodepositing an additional metal layer on the bonding layer, and subsequently performing the step of connecting the core block to the metal block by means of solder provided between the additional metal layer and the metal block.

3. A method as in claim 1 wherein the bonding layer consists of at least one member from the group consisting of Ti, Cr, Ag, $TiO_2$, and CrO.

4. A method as in claim 1 wherein said layer is provided by means of vapor deposition.

5. A method as in claim 1 wherein said layer is provided by means of sputtering.

6. A method as in claim 1 wherein said solder is glass solder.

7. A method as in claim 1 wherein said solder is metal solder.

8. A method as in claim 1 wherein a bonding layer is provided between the metal block and the solder.

* * * * *